US012158120B2

(12) United States Patent
Iizumi et al.

(10) Patent No.: US 12,158,120 B2

(45) Date of Patent: Dec. 3, 2024

(54) CYLINDER HEAD, CYLINDER BLOCK, INTERNAL COMBUSTION ENGINE, AND METHOD FOR MANUFACTURING CYLINDER HEAD

(71) Applicant: MITSUBISHI HEAVY INDUSTRIES ENGINE & TURBOCHARGER, LTD., Sagamihara (JP)

(72) Inventors: Masayuki Iizumi, Kanagawa (JP); Motoi Kawashima, Kanagawa (JP); Takuya Kumagai, Kanagawa (JP); Makoto Sakaguchi, Kanagawa (JP); Kazunori Sawazaki, Kanagawa (JP); Hideho Narita, Kanagawa (JP); Ryuji Katayama, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/223,920

(22) Filed: Jul. 19, 2023

(65) Prior Publication Data

US 2023/0358189 A1 Nov. 9, 2023

Related U.S. Application Data

(62) Division of application No. 17/911,861, filed as application No. PCT/JP2021/015606 on Apr. 15, 2021, now Pat. No. 11,994,084.

(30) Foreign Application Priority Data

Apr. 16, 2020 (JP) ................................ 2020-073563

(51) Int. Cl.

*F02F 1/40* (2006.01)
*C21D 1/09* (2006.01)

(Continued)

(52) U.S. Cl.

CPC .................. *F02F 1/40* (2013.01); *C21D 1/09* (2013.01); *C21D 5/00* (2013.01); *C21D 9/0068* (2013.01);

(Continued)

(58) Field of Classification Search

CPC ........ F02F 1/00; F02F 1/18; F02F 1/24; F02F 1/40; F02F 11/002; F02F 2200/00;

(Continued)

(56) References Cited

U.S. PATENT DOCUMENTS 4,917,169 A * 4/1990 Melde-Tuczai .... B22D 19/0009 164/369
10,113,504 B2 * 10/2018 Wang ........................ B22C 9/10

(Continued)

FOREIGN PATENT DOCUMENTS

DE 101 37 594 A1 2/2003
EP 2 025 776 A1 2/2009

(Continued)

OTHER PUBLICATIONS

Extended European Search Report for European Application No. 21787810.7, dated Jun. 30, 2023.

(Continued)

*Primary Examiner* — Grant Moubry

(74) *Attorney, Agent, or Firm* — Birch, Stewart, Kolasch & Birch, LLP

(57) ABSTRACT

The present invention suppresses leakage of combustion gas from a contact surface. A cylinder head (20) is attached to a cylinder block. The surface (26) of the side of the cylinder head (20) that is attached to the cylinder block includes a first region (AH1) and a second region (AH2) that has higher hardness than the first region (AH1).

2 Claims, 6 Drawing Sheets

(51) Int. Cl.
*C21D 5/00* (2006.01)
*C21D 9/00* (2006.01)

(52) U.S. Cl.
CPC ...... *C21D 2221/01* (2013.01); *F02F 2200/00* (2013.01)

(58) Field of Classification Search
CPC .......... C21D 1/09; C21D 5/00; C21D 9/0068; C21D 2221/00; C21D 2221/01; C22C 37/00
See application file for complete search history.

(56) References Cited

U.S. PATENT DOCUMENTS

| | | | | |
|---|---|---|---|---|
| 10,690,087 | B2 * | 6/2020 | Wang | B23K 20/122 |
| 2015/0204233 | A1 | 7/2015 | Nanba et al. | |
| 2016/0138717 | A1 | 5/2016 | Yasuda et al. | |
| 2018/0340613 | A1 | 11/2018 | Yasuda et al. | |

FOREIGN PATENT DOCUMENTS

| | | | |
|---|---|---|---|
| JP | 63-12867 | A | 1/1988 |
| JP | 64-56948 | A | 3/1989 |
| JP | 2005-194937 | A | 7/2005 |
| JP | 2016-94978 | A | 5/2016 |

OTHER PUBLICATIONS

U.S. Office Action for U.S. Appl. No. 17/911,861, dated Jul. 25, 2023.

Written Opinion of the International Searching Authority for International Application No. PCT/JP2021/015606, dated Jul. 6, 2021, with an English translation.

* cited by examiner

CYLINDER HEAD, CYLINDER BLOCK, INTERNAL COMBUSTION ENGINE, AND METHOD FOR MANUFACTURING CYLINDER HEAD

This application is a Divisional of copending application Ser. No. 17/911,861, filed on Sep. 15, 2022, which is the National Phase under 35 U.S.C. § 371 of International Application No. PCT/JP2021/015606, filed on Apr. 15, 2021, which claims the benefit under 35 U.S.C. § 119(a) to Patent Application No. 2020-073563, filed in Japan on Apr. 16, 2020, all of which are hereby expressly incorporated by reference into the present application.

TECHNICAL FIELD

The present invention relates to a cylinder head, a cylinder block, an internal combustion engine, and a method for manufacturing a cylinder head.

BACKGROUND ART

In an internal combustion engine, a cylinder head is attached to a cylinder block. The cylinder head is fastened to the cylinder block with a fastening member such as a bolt and is attached to the cylinder block while the surfaces of the cylinder head and the cylinder block are in contact with each other via a gasket, for example. PTL 1 describes that laser quenching is performed on a cylinder liner sliding surface.

The cylinder head and the cylinder block seal the combustion gas in the contact surface thereof. In recent years, the in-cylinder pressure tends to increase due to the influence of downsizing and the like. The sealing defect may occur when the in-cylinder pressure increases. Thereby, in the related art, the sealing property has been improved by increasing the axial force of the fastening member, increasing the number of fastening members, improving the structure of the gasket, and the like.

CITATION LIST

Patent Literature

[PTL 1] Japanese Unexamined Patent Application Publication No. 63-12867

SUMMARY OF INVENTION

Technical Problem

However, even with a method in the related art, the improvement of the sealing property is insufficient, thereby some parts of the contact surface between the cylinder head and the cylinder head gasket and the contact surface between the cylinder block and the cylinder head gasket cause relative slippage, the contact surface is worn, and then the combustion gas may leak. For example, even when the axial force of the fastening member is increased, the sealing property may not be appropriately improved at a location away from the fastening member. Further, there is a limit to increasing the number of fastening members due to a layout, so that the improvement of the structure of the gasket may be insufficient. Therefore, it is required to improve the capability to suppress leakage of the combustion gas from the contact surface between the cylinder head and the cylinder block.

The present disclosure has been made to solve the above-mentioned problems, and an object of the present invention is to provide a cylinder head, a cylinder block, an internal combustion engine, and a method for manufacturing a cylinder head capable of suppressing leakage of combustion gas from a contact surface.

Solution to Problem

In order to solve the above problems and to achieve the goal, a cylinder head according to the present disclosure is a cylinder head that is to be attached to a cylinder block, in which a surface of the cylinder head on a side to be attached to the cylinder block includes a first region and a second region having hardness higher than that of the first region.

In order to solve the above problems and to achieve the goal, a cylinder block according to the present disclosure is a cylinder block that is to be attached to a cylinder head, in which a surface of the cylinder block on a side to be attached to the cylinder head includes a first region and a second region having hardness higher than that of the first region.

In order to solve the above problems and to achieve the goal, an internal combustion engine according to the present disclosure includes one or more cylinder heads and a cylinder block.

In order to solve the above problems and to achieve the goal, a method for manufacturing a cylinder head is a method for manufacturing a cylinder head that is to be attached to a cylinder block, the method includes forming a first region where a curing treatment is not performed and a second region, where the curing treatment is performed and hardness is higher than that of the first region, by performing the curing treatment on a part of a surface of the cylinder head on a side to be attached to the cylinder block.

Advantageous Effects of Invention

According to the present disclosure, leakage of combustion gas from a contact surface can be suppressed.

DESCRIPTION OF EMBODIMENTS

Preferred embodiments of the present invention will be described in detail below with reference to the accompanying drawings. The present invention is not limited to this embodiment, and when there is a plurality of embodiments, the present invention also includes a combination of the respective embodiments.

(Overall Configuration of Internal Combustion Engine)

Figure 1:
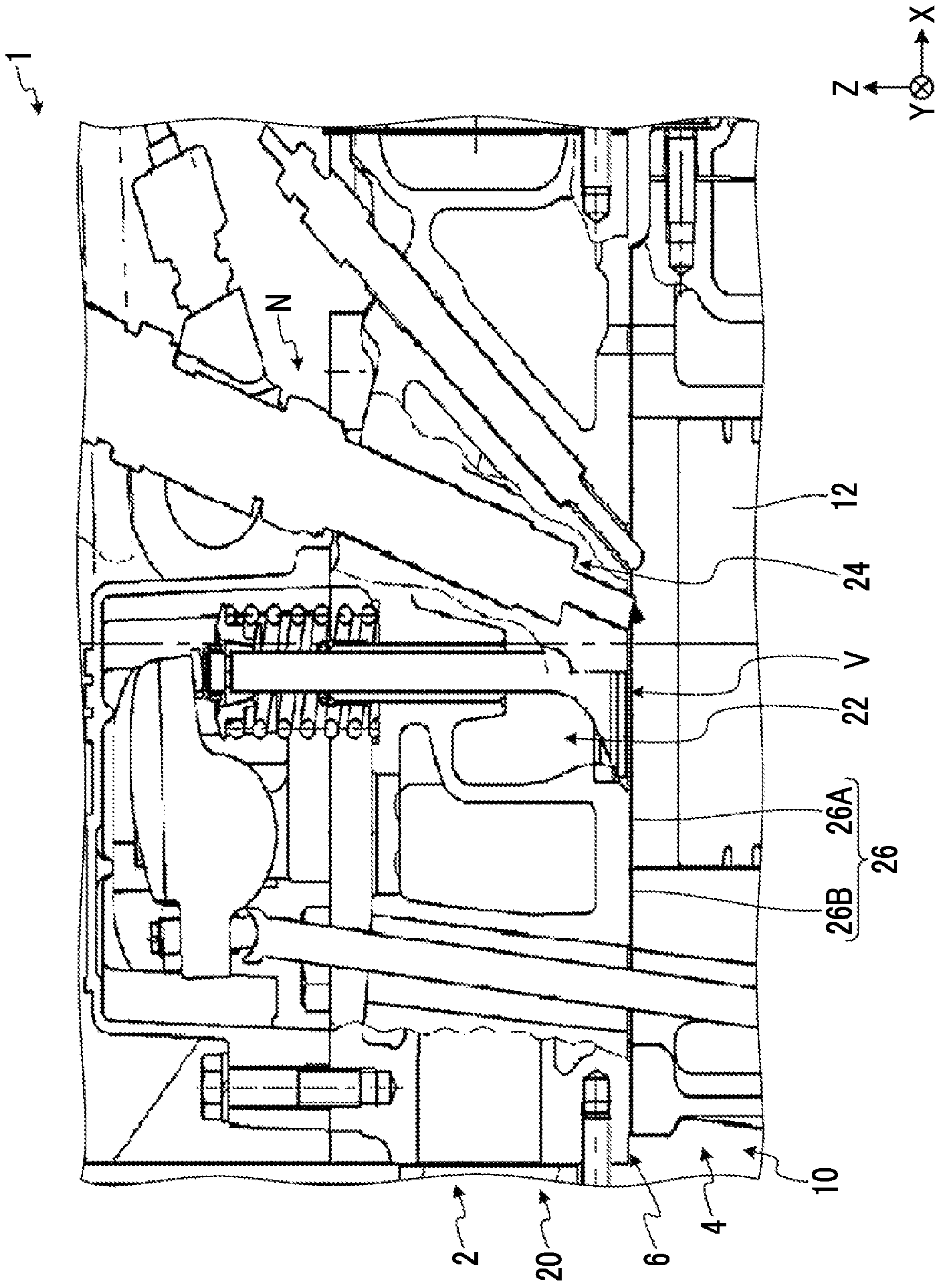
FIG. 1 is a schematic partial cross-sectional view of an internal combustion engine according to the present embodiment.

FIG. 1 is a schematic partial cross-sectional view of an internal combustion engine according to the present embodiment. As shown in FIG. 1, the internal combustion engine 1 according to the present embodiment includes a cylinder head assembly 2, a cylinder block assembly 4, and a gasket 6. The internal combustion engine 1 is an engine powered by the combustion of fuel, and examples thereof include a diesel engine, a gasoline engine, and a gas engine. The internal combustion engine 1 can be used for anything and may be an engine, for example, for a vehicle, a ship, a generator, an industrial use, or an engine for a fixed facility.

(Cylinder Block Assembly)

Figure 3:
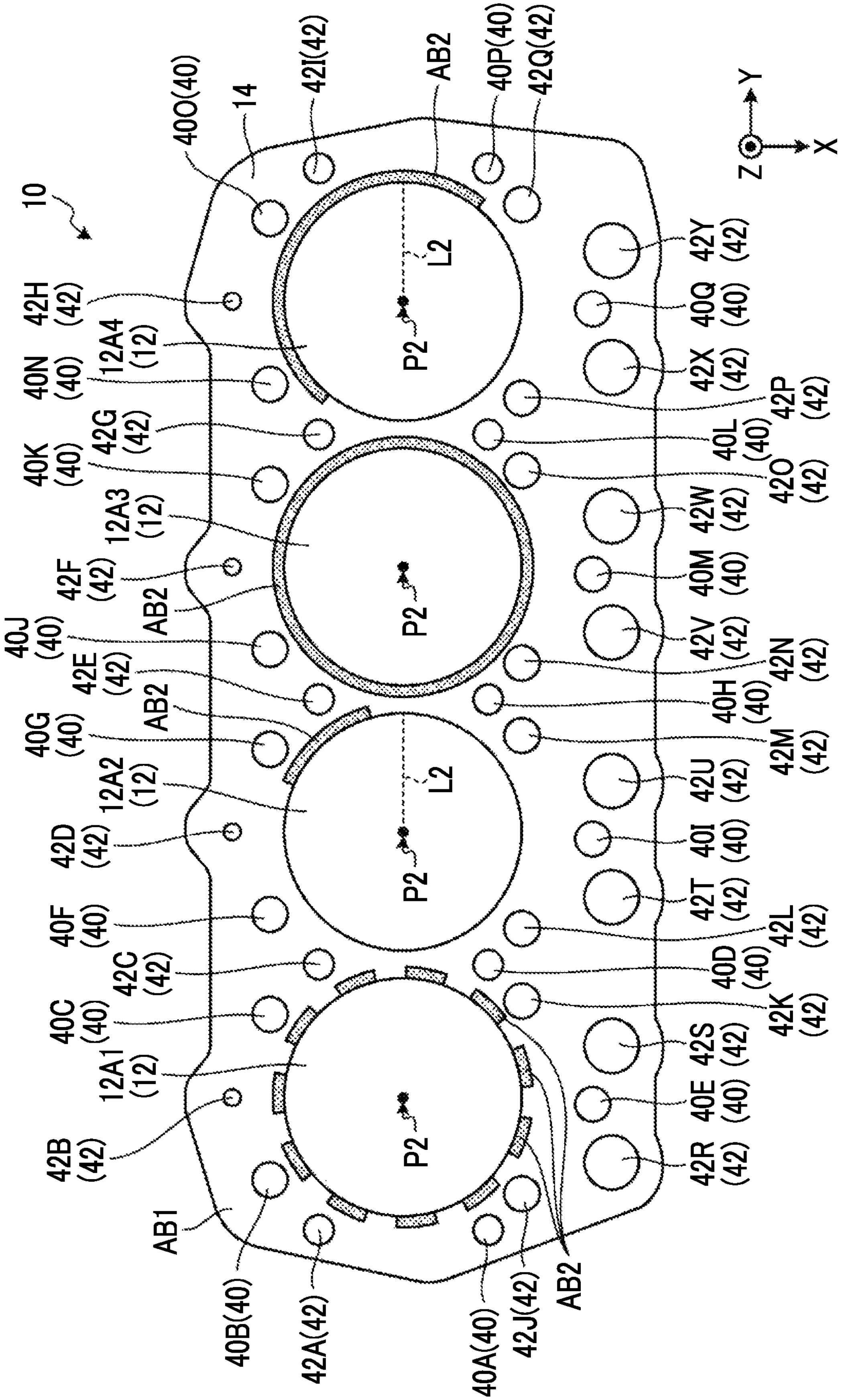
FIG. 3 is a schematic view of a mating surface of the cylinder block with the cylinder head according to the present embodiment.

The cylinder block assembly 4 includes a cylinder block 10 and a piston P. In the present embodiment, a material of the cylinder block 10 is cast iron and may be, for example, FC250 defined by JIS G5501:1995, FCD400 defined by JIS G5502:2001, FCD450, or the like. However, the material of the cylinder block 10 is not limited to the above-described materials. An opening 12 is formed in the cylinder block 10. The opening 12 opens to a surface 14 of the cylinder block 10. The opening 12 is provided with the piston P that is connected to a crankshaft (not shown). The piston P slides inside the opening 12 in an extending direction of the opening 12. A space surrounded by the piston P, an inner peripheral surface of the opening 12, and a first portion 26A of the cylinder head 20 described later becomes a combustion chamber. A cylinder liner, which is a cylindrical member, may be inserted into the opening 12. Hereinafter, a direction (the extending direction of the opening 12) along a movement direction of the piston P from the cylinder block 10 to the cylinder head 20 side is referred to as a direction Z. Further, a direction orthogonal to the direction Z is defined as a direction X, and a direction orthogonal to the direction Z and the direction X is defined as a direction Y. In the present embodiment, the internal combustion engine 1 has multiple cylinders, and a plurality of openings 12 are provided in the direction Y. As shown in the example of FIG. 3 described later, the internal combustion engine 1 is formed with four openings 12 in the direction Y, but the present disclosure is not limited to this. The number of openings 12 (number of cylinders) may be any number or an arrangement direction of the openings 12 may be any direction.

(Cylinder Head Assembly)

A cylinder head assembly 2 includes the cylinder head 20, a valve V, and an ignition device N. The ignition device N is a device for igniting the combustion chamber. The ignition device N is a nozzle into which high-pressure fuel is injected in the present embodiment and can be called an ignition device because the high-pressure fuel injected from the nozzle spontaneously ignites. However, the ignition device N is not limited to the nozzle and may be, for example, a spark ignition device that ignites by discharging. The cylinder head 20 is attached to the cylinder block 10 with a surface 26 in contact with the surface 14 of the cylinder block 10 via a gasket 6 by tightening with a fastening member (a bolt here) (not shown). It can be said that the surface 26 of the cylinder head 20 is pressed against the surface 14 of the cylinder block 10. The gasket 6 is not an essential configuration, and the surface 26 of the cylinder head 20 and the surface 14 of the cylinder block 10 may be in direct contact with each other.

Since the opening 12 is formed on the surface 14 of the cylinder block 10, it can be said that the surface 26 of the cylinder head 20 includes a first portion 26A overlapping the opening 12 when viewed from the direction Z and a second portion 26B overlapping the surface 14 of the cylinder block 10 when viewed from the direction Z. Since the cylinder head 20 covers the opening 12 with the first portion 26A, it can be said that the first portion 26A is a portion exposed to combustion gas generated in the combustion chamber. Further, the second portion 26B is a portion that does not overlap the opening 12 and is pressed against the surface 14 of the cylinder block 10 and is not exposed to the combustion gas. It can be said that the second portion 26B is formed on an outer side in a radial direction with respect to the first portion 26A when the central axis along the direction Z of the first portion 26A is the center.

In the present embodiment, the material of the cylinder head 20 is cast iron and may be, for example, FC250 defined in JIS G5501:1995 or FC300. However, the material of the cylinder head 20 is not limited to the above-described materials.

The cylinder head 20 is formed with an opening such as an intake port 22 or an opening 24 for an ignition device. The opening such as the intake port 22 and the opening 24 for an ignition device is open in the first portion 26A on the surface 26. The intake port 22 is provided with a valve V for introducing air into the combustion chamber, and the opening 24 for an ignition device is provided with the ignition device N for injecting fuel into the combustion chamber. Although not shown, the cylinder head 20 may be formed with an exhaust port for discharging gas from the combustion chamber. In this case, the exhaust port also is open to the first portion 26A on the surface 26. That is, it can be said that the first portion 26A is a region on the surface 26 in which an opening communicating with the combustion chamber (here, the intake port 22, the opening 24 for an ignition device, or the like) is formed. For example, an opening may be formed over a part or the entire of the first portion 26A, and the intake port 22, the opening 24 for an ignition device, or the like may communicate with the opening. In this case, the space surrounded by the opening of the first portion 26A, the piston P, and the opening 12 of the cylinder block 10 becomes the combustion chamber.

(Surface of Cylinder Head)

Figure 2:
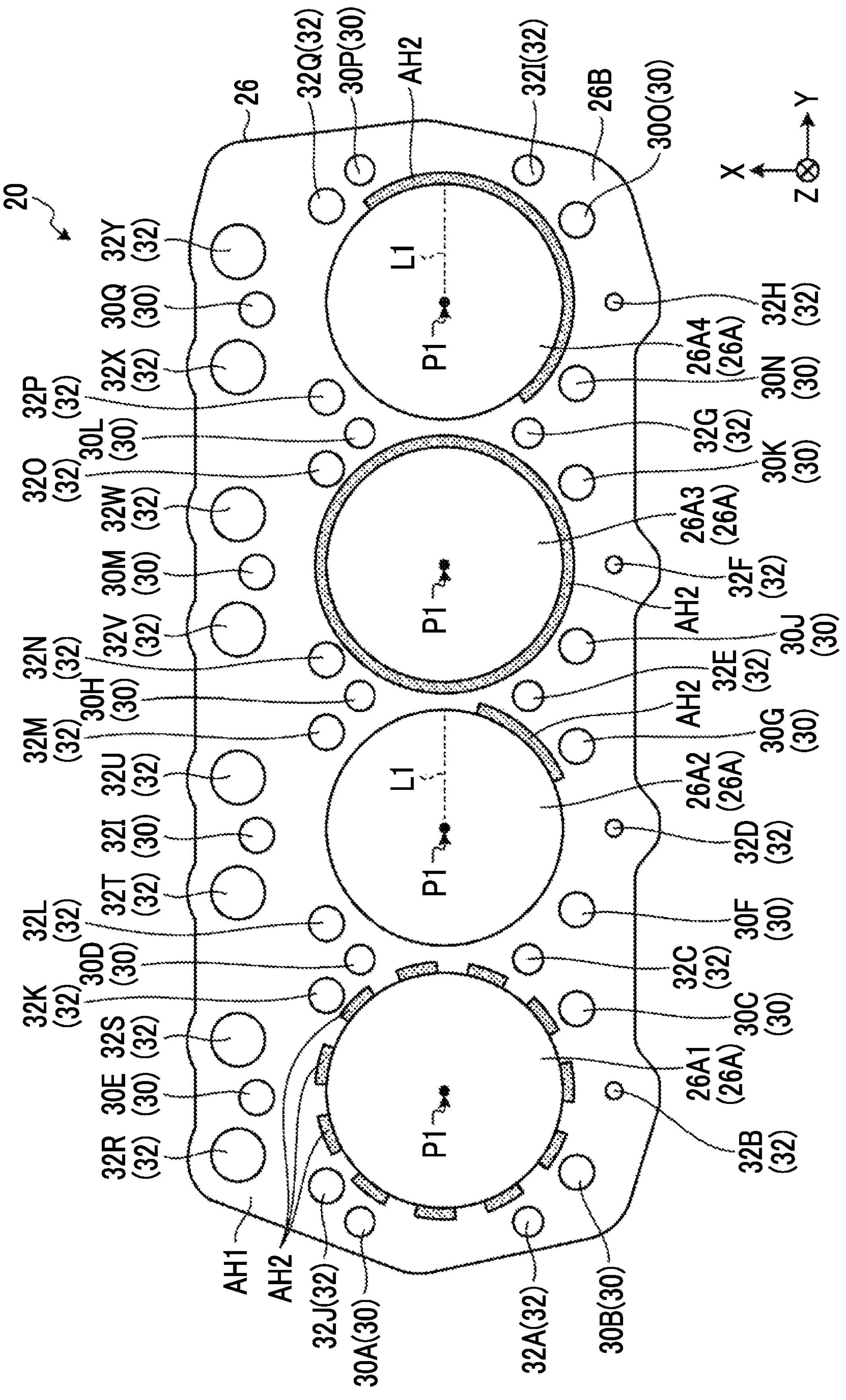
FIG. 2 is a schematic view of a mating surface of a cylinder head with a cylinder block according to the present embodiment.

FIG. 2 is a schematic view of a mating surface of the cylinder head with the cylinder block according to the present embodiment. As shown in FIG. 2, in the cylinder head 20, a plurality of first portions 26A are formed along the direction Y in accordance with the openings 12 (see FIG. 3) of the cylinder block 10. In the example of FIG. 1, as the first portion 26A, the first portions 26A1, 26A2, 26A3, and 26A4 are arranged in the direction Y. Further, as shown in FIG. 2, fastening holes 30 and fluid circulation ports 32 are formed on the surface 26 of the cylinder head 20. The fastening holes 30 are holes (openings) into which the fastening members for fastening the cylinder head 20 and the cylinder block 10 are inserted, and a plurality of fastening holes 30 are formed on the surface 26. The fluid circulation port 32 is a hole through which a fluid circulates, and a plurality of fluid circulation ports 32 are formed on the surface 26. A fluid that is different from the combustion gas, which is generated by the combustion of the fuel inside the combustion chamber, circulates through the fluid circulation port 32. Any type can be used for the type of the fluid that circulates through the fluid circulation port 32, for example, the fluid may be cooling water for cooling the internal combustion engine 1, lubricant for lubricating the internal combustion engine 1, or the like.

The fastening hole 30 is open to the second portion 26B on the surface 26. The fastening hole 30 is formed in the second portion 26B around the first portion 26A. More specifically, the plurality of fastening holes 30 are formed along a circumferential direction when the central axis along the direction Z of the first portion 26A is the center. In the present embodiment, the fastening hole 30Q is formed from the fastening hole 30A as the fastening hole 30. The fastening holes 30A, 30B, 30C, 30D, and 30E are formed so as to be arranged around the first portion 26A1 along the circumferential direction of the first portion 26A1. Further, the fastening holes 30D, 30F, 30G, 30H, and 30I are formed so as to be arranged around the first portion 26A2 along the circumferential direction of the first portion 26A2. Further, the fastening holes 30H, 30J, 30K, 30L, and 30M are formed so as to be arranged around the first portion 26A3 along the circumferential direction of the first portion 26A3. Further, the fastening holes 30L, 30N, 300, 30P, and 30Q are formed so as to be arranged around the first portion 26A4 along the circumferential direction of the first portion 26A4. However, FIG. 2 is an example, and the total number of fastening holes 30 formed in the cylinder head 20 or the number of fastening holes 30 around one first portion 26A may be any number.

The fastening holes 30 around the first portion 26A are not arranged at equal intervals in the circumferential direction, in other words, a distance between the fastening holes 30 adjacent to each other in the circumferential direction is not constant. For example, at least one of a distance between the fastening hole 30A and the fastening hole 30B, a distance between the fastening hole 30B and the fastening hole 30C, a distance between the fastening hole 30C and the fastening hole 30D, a distance between the fastening hole 30D and the fastening hole 30E, and a distance between the fastening hole 30E and the fastening hole 30A is different from the others. In the example of FIG. 2, among those distances, the distance between the fastening hole 30C and the fastening hole 30D is the longest. However, the fastening holes 30 around the first portion 26A may be arranged at equal intervals in the circumferential direction.

The fluid circulation port 32 is open to the second portion 26B on the surface 26. In the present embodiment, the fluid circulation port 32Y is formed from the fluid circulation port 32A as the fluid circulation port 32. The fluid circulation port 32A to the fluid circulation port 32I are formed on the side opposite to the direction X from the center point P1 when the first portion 26A is viewed from the direction Z, that is, formed on an intake side, and the fluid circulation port 32A to the fluid circulation port 32I are arranged in this order in the direction Y. The fluid circulation port 32A is positioned on the side opposite to the direction Y with respect to the center point P1 of the first portion 26A1, and the fluid circulation port 32B is positioned on the side opposite to the direction X with respect to the center point P1 of the first portion 26A1. The fluid circulation port 32C is positioned on the direction Y side with respect to the center point P1 of the first portion 26A1 and on the side opposite to the direction Y with respect to the center point P1 of the first portion 26A2, and the fluid circulation port 32D is positioned on the side opposite to the direction X with respect to the center point P1 of the first portion 26A2. The fluid circulation port 32E is positioned on the direction Y side with respect to the center point P1 of the first portion 26A2 and on the side opposite to the direction Y with respect to the center point P1 of the first portion 26A3, and the fluid circulation port 32F is positioned on the side opposite to the direction X with respect to the center point P1 of the first portion 26A3. The fluid circulation port 32G is positioned on the direction Y side with respect to the center point P1 of the first portion 26A3 and on the side opposite to the direction Y with respect to the center point P1 of the first portion 26A4, the fluid circulation port 32H is positioned on the side opposite to the direction X with respect to the center point P1 of the first portion 26A4, the fluid circulation port 32I is positioned in the direction Y with respect to the center point P1 of the first portion 26A4. However, the number of fluid circulation ports 32 and the position thereof are not limited to this and may be any number and position.

The fluid circulation port 32J to the fluid circulation port 32Y are formed on the direction X side from the center point P1 of the first portion 26A, that is, on the exhaust side. The fluid circulation port 32J to the fluid circulation port 32Q are arranged in this order in the direction Y. The fluid circulation port 32J is positioned on the side opposite to the direction Y with respect to the center point P1 of the first portion 26A1, and the fluid circulation port 32K is positioned on the direction Y side with respect to the center point P1 of the first portion 26A1. The fluid circulation port 32L is positioned on the side opposite to the direction Y with respect to the center point P1 of the first portion 26A2, and the fluid circulation port 32M is positioned on the direction Y side with respect to the center point P1 of the first portion 26A2. The fluid circulation port 32N is positioned on the side opposite to the direction Y with respect to the center point P1 of the first portion 26A3, and the fluid circulation port 32O is positioned on the direction Y side with respect to the center point P1 of the first portion 26A3. The fluid circulation port 32P is positioned on the side opposite to the direction Y with respect to the center point P1 of the first portion 26A4, and the fluid circulation port 32Q is positioned on the direction Y side with respect to the center point P1 of the first portion 26A4. However, the number of fluid circulation ports 32 and the position thereof are not limited to this and may be any number and position.

The fluid circulation port 32R to the fluid circulation port 32Y are arranged in this order in the direction Y. Further, the fluid circulation port 32R to the fluid circulation port 32Y are positioned on the direction X side from the fluid circulation port 32J to the fluid circulation port 32Q. The fluid circulation port 32R is positioned on the side opposite to the direction Y with respect to the center point P1 of the first portion 26A1, and the fluid circulation port 32S is positioned on the direction Y side with respect to the center point P1 of the first portion 26A1. The fluid circulation port 32T is positioned on the side opposite to the direction Y with respect to the center point P1 of the first portion 26A2, and the fluid circulation port 32U is positioned on the direction Y side with respect to the center point P1 of the first portion 26A2. The fluid circulation port 32V is positioned on the side opposite to the direction Y with respect to the center point P1 of the first portion 26A3, and the fluid circulation port 32W is positioned on the direction Y side with respect to the center point P1 of the first portion 26A3. The fluid circulation port 32X is positioned on the side opposite to the direction Y with respect to the center point P1 of the first portion 26A4, and the fluid circulation port 32Y is positioned on the direction Y side with respect to the center point P1 of the first portion 26A4. However, the number of fluid circulation ports 32 and the position thereof are not limited to this and may be any number and position.

As described above, various holes such as the fastening holes 30 and the fluid circulation ports 32 are formed in the second portion 26B on the surface 26 of the cylinder head 20. The second portion 26B seals the combustion gas such that the combustion gas inside the combustion chamber does not leak to the outside of the combustion chamber by being in contact with the surface 14 of the cylinder block 10 via the gasket 6 while being applied with a surface pressure. However, when the combustion gas inside the combustion chamber becomes high pressure, the second portion 26B wears by causing a relative slippage with respect to the surface 14, thereby the combustion gas may leak between the second portion 26B and the surface 14. When the combustion gas leaks between the second portion 26B and the surface 14, there is a possibility that the combustion gas leaks to a hole, through which other than the combustion gas circulate such as the fluid circulation port 32, or to the outside of the cylinder head 20. In contrast to this, the cylinder head 20 according to the present embodiment suppresses the wear of the second portion 26B by forming a region with high hardness in a part of the second portion 26B, thereby the leakage of the combustion gas between the second portion 26B and the surface 14 is suppressed. Hereinafter, a specific description will be given.

(First Region and Second Region on Surface of Cylinder Head)

As shown in FIG. 2, the surface 26 of the cylinder head 20 includes a first region AH1 and a second region AH2 having the hardness higher than that of the first region AH1. Furthermore, the second portion 26B on the surface 26 includes the first region AH1 and the second region AH2. In other words, in the entire region of the second portion 26B, a region other than the second region AH2 is the first region AH1. The second region AH2 preferably has the HV0.2 hardness of 2.5 times or more and 4.5 times or less at the depth of 0.3 mm to 0.5 mm with respect to the first region AH1. Further, the second region AH2 preferably has the HV0.2 hardness of 200 or more and 400 or less at the depth of 0.1 mm. By setting the hardness of the second region AH2 in the above range, wear can be appropriately suppressed. The first portion 26A on the surface 26 of the cylinder head 20 may include only the first region AH1. That is, the first portion 26A that is exposed to the combustion gas does not have to include the second region AH2 having high hardness.

The second region AH2 is formed by performing a curing treatment on the surface 26 for improving the hardness. That is, in the second portion 26B, the region where the curing treatment is not performed is the first region AH1, and the region where the curing treatment is performed is the second region AH2. In the present embodiment, laser quenching is used as the curing treatment. That is, in the second portion 26B, the region where the laser beam is not applied and the laser quenching is not performed is the first region AH1, and the region where the laser beam is applied and the laser quenching is performed is the second region AH2. However, the curing treatment is not limited to the laser quenching, for example, a high frequency quenching, a shot peening, a WPC Treatment (registered trademark), or the like may be used.

The second region AH2 is formed in the second portion 26B around the first portion 26A. The second region AH2 is formed in at least a part of a section in the entire circumference surrounding the first portion 26A. That is, the second region AH2 may be formed over the entire circumference surrounding the first portion 26A or may be formed in a part of section in the entire circumference surrounding the first portion 26A. When the second region AH2 is formed in a part of section in the entire circumference surrounding the first portion 26A, the other section in the entire circumference becomes the first region AH1. Furthermore, the second region AH2 is formed between the first portion 26A and the fluid circulation port 32 around the first portion 26A and in the radial direction around the center point P1 of the first portion 26A. In other words, the second region AH2 is formed on the outer side of the first portion 26A and inside the fluid circulation port 32 or the fastening hole 30 in the radial direction around the center point P1 of the first portion 26A. It can be said that the first region AH1 is formed on the outer side of the fluid circulation port 32 or the fastening hole 30, but the second region AH2 is not formed thereon.

In the example of FIG. 2, a plurality of second regions AH2 are formed around the first portion 26A1 on the opposite side of the direction Y at predetermined intervals in the circumferential direction. The length of the interval between the second regions AH2 arranged in the circumferential direction of the first portion 26A1 may be set to any length. Further, in the example of FIG. 2, the second region AH2 is formed around the first portion 26A2 at a location, which is on the direction Y side of the first portion 26A2 and opposite to the direction X. Specifically, when a virtual straight line L1 from the center point P1 of the first portion 26A2 toward the direction Y is defined as 0 degrees, the direction X side is defined as positive, and the side opposite to the direction X is defined as negative, the second region AH2 is formed from a position of −50 degrees to a position of −20 degrees. Further, in the example of FIG. 2, the second region AH2 is formed around the first portion 26A3 and on the entire circumference surrounding the first portion 26A3. Further, in the example of FIG. 2, the second region AH2 is formed from a position of −135 degrees to a position of −45 degrees around the first portion 26A4. However, the positions of the second regions AH2 formed around each of the first portions 26A1, 26A2, 26A3, and 26A4 are not limited to the above. For example, the positions of the second regions AH2 formed around any of the first portions 26A1, 26A2, 26A3, and 26A4 in FIG. 2 may be applied around all the first portions 26A.

As described above, since the second region AH2 having high hardness is formed on the surface 26 of the cylinder head 20, even when the improvement of the sealing property is insufficient with the method in the related art, the wear of the surface 26 is suppressed and the leakage of the combustion gas is suppressed. Further, by not making the entire region of the surface 26 of the cylinder head 20 the second region AH2 and leaving the region for the first region AH1, it is not necessary to perform the curing treatment on unnecessary locations, and the load of the curing treatment can be reduced. Further, by providing the second region AH2 around the first portion 26A, it is possible to appropriately suppress the leakage of the combustion gas to the outer side of the first portion 26A.

(Surface of Cylinder Block)

FIG. 3 is a schematic view of a mating surface of the cylinder block with the cylinder head according to the present embodiment. As shown in FIG. 3, the cylinder block 10 has a plurality of openings 12 formed along the direction Y. In the example of FIG. 1, the openings 12A1, 12A2, 12A3, and 12A4 are arranged in the direction Y as the openings 12. The openings 12A1, 12A2, 12A3, and 12A4 are covered by the first portions 26A1, 26A2, 26A3, and 26A4 (see FIG. 2) of the cylinder head 20, respectively. As shown in FIG. 3, fastening holes 40 and fluid circulation ports 42 are formed on the surface 14 of the cylinder block 10. The fastening holes 40 are holes (openings) into which the fastening members for fastening the cylinder head 20 and the cylinder block 10 are inserted, and a plurality of fastening holes 40 are formed on the surface 14. The fluid circulation port 42 is a hole through which a fluid circulates, and a plurality of fluid circulation ports 42 are formed on the surface 14. A fluid that is different from the combustion gas, which is generated by the combustion of the fuel inside the combustion chamber, circulates through the fluid circulation port 42. Any type can be used for the type of the fluid that circulates through the fluid circulation port 42, for example, the fluid may be cooling water for cooling the internal combustion engine 1, lubricant for lubricating the internal combustion engine 1, or the like.

The fastening hole 40 is formed on the surface 14 around the opening 12. The plurality of fastening holes 40 are formed along the circumferential direction when the central axis along the direction Z of the opening 12 is the center. In the present embodiment, the fastening hole 40Q is formed from the fastening hole 40A as the fastening hole 40. Each of the fastening holes 40A to the fastening hole 40Q and each of the fastening holes 30A to the fastening hole 30Q of the cylinder head 20 communicate with each other. The fastening holes 40A, 40B, 40C, 40D, and 40E are formed so as to be arranged around the opening 12A1 along the circumferential direction of the opening 12A1. Further, the fastening holes 40D, 40F, 40G, 40H, and 40I are formed so as to be arranged around the opening 12A2 along the circumferential direction of the opening 12A2. Further, the fastening holes 40H, 40J, 40K, 40L, and 40M are formed so as to be arranged around the opening 12A3 along the circumferential direction of the opening 12A3. Further, the fastening holes 40L, 40N, 400, 40P, and 40Q are formed so as to be arranged around the opening 12A4 along the circumferential direction of the first portion 26A3. However, FIG. 3 is an example, and the total number of fastening holes 40 formed in the cylinder block 10 or the number of fastening holes 40 around one opening 12 may be any number.

The fastening holes 40 around the opening 12 are not arranged at equal intervals in the circumferential direction, in other words, a distance between the fastening holes 40 adjacent to each other in the circumferential direction is not constant. For example, at least one of a distance between the fastening hole 40A and the fastening hole 40B, a distance between the fastening hole 40B and the fastening hole 40C, a distance between the fastening hole 40C and the fastening hole 40D, a distance between the fastening hole 40D and the fastening hole 40E, a distance between the fastening hole 40E and the fastening hole 40A is different from the others, and among those distances, the distance between the fastening hole 40C and the fastening hole 40D is the longest. However, the fastening holes 40 around the opening 12 may be arranged at equal intervals in the circumferential direction.

In the present embodiment, the fluid circulation port 42Y is formed from the fluid circulation port 42A as the fluid circulation port 42. The fluid circulation port 42A to the fluid circulation port 42I are formed on the surface 14 on the side opposite to the direction X from the center point P2 when the opening 12 is viewed from the direction Z, that is, formed on an intake side, and the fluid circulation port 42A to the fluid circulation port 42I are arranged in this order in the direction Y. Each of the fluid circulation port 42A to the fluid circulation port 42I and each of the fluid circulation port 32A to the fluid circulation port 32I of the cylinder head 20 communicate with each other. The fluid circulation port 42A is positioned on the side opposite to the direction Y with respect to the center point P2 of the opening 12A1, and the fluid circulation port 42B is positioned on the side opposite to the direction X with respect to the center point P2 of the opening 12A1. The fluid circulation port 42C is positioned on the direction Y side with respect to the center point P2 of the opening 12A1 and on the side opposite to the direction Y with respect to the center point P2 of the opening 12A2, and the fluid circulation port 42D is positioned on the side opposite to the direction X with respect to the center point P2 of the opening 12A2. The fluid circulation port 42E is positioned on the direction Y side with respect to the center point P2 of the opening 12A2 and on the side opposite to the direction Y with respect to the center point P2 of the opening 12A3, and the fluid circulation port 42F is positioned on the side opposite to the direction X with respect to the center point P2 of the opening 12A3. The fluid circulation port 42G is positioned on the direction Y side with respect to the center point P2 of the opening 12A3 and on the side opposite to the direction Y with respect to the center point P2 of the opening 12A4, the fluid circulation port 42H is positioned on the side opposite to the direction X with respect to the center point P2 of the opening 12A4, the fluid circulation port 42I is positioned in the direction Y with respect to the center point P2 of the opening 12A4. However, the number of fluid circulation ports 42 and the position thereof are not limited to this and may be any number and position.

The fluid circulation port 42J to the fluid circulation port 42Y are formed on the surface 14 on the direction X side from the center point P2 of the opening 12, that is, on the exhaust side. In the present embodiment, the fluid circulation port 42J to the fluid circulation port 42Q are arranged in this order in the direction Y. Each of the fluid circulation port 42J to the fluid circulation port 42Q and each of the fluid circulation port 32J to the fluid circulation port 32Q of the cylinder head 20 communicate with each other. The fluid circulation port 42J is positioned on the side opposite to the direction Y with respect to the center point P2 of the opening 12A1, and the fluid circulation port 42K is positioned on the direction Y side with respect to the center point P2 of the opening 12A1. The fluid circulation port 42L is positioned on the side opposite to the direction Y with respect to the center point P2 of the opening 12A2, and the fluid circulation port 42M is positioned on the direction Y side with respect to the center point P2 of the opening 12A2. The fluid circulation port 42N is positioned on the side opposite to the direction Y with respect to the center point P2 of the opening 12A3, and the fluid circulation port 42O is positioned on the direction Y side with respect to the center point P2 of the opening 12A3. The fluid circulation port 42P is positioned on the side opposite to the direction Y with respect to the center point P2 of the opening 12A4, and the fluid circulation port 42Q is positioned on the direction Y side with respect to the center point P2 of the opening 12A4. However, the number of fluid circulation ports 44 and the position thereof are not limited to this and may be any number and position.

The fluid circulation port 42R to the fluid circulation port 42Y are arranged in this order in the direction Y. Further, the fluid circulation port 42R to the fluid circulation port 42Y are positioned on the direction X side from the fluid circulation port 42J to the fluid circulation port 42Q. Each of the fluid circulation port 42R to the fluid circulation port 42Y and each of the fluid circulation port 32R of the cylinder head 20 to the fluid circulation port 32Y communicate with each other. The fluid circulation port 42R is positioned on the side opposite to the direction Y with respect to the center point P2 of the opening 12A1, and the fluid circulation port 42S is positioned on the direction Y side with respect to the center point P2 of the opening 12A1. The fluid circulation port 42T is positioned on the side opposite to the direction Y with respect to the center point P2 of the opening 12A2, and the fluid circulation port 42U is positioned on the direction Y side with respect to the center point P2 of the opening 12A2. The fluid circulation port 42V is positioned on the side opposite to the direction Y with respect to the center point P2 of the opening 12A3, and the fluid circulation port 42W is positioned on the direction Y side with respect to the center point P2 of the opening 12A3. The fluid circulation port 42X is positioned on the side opposite to the direction Y with respect to the center point P2 of the opening 12A4, and the fluid circulation port 42Y is positioned on the direction Y side with respect to the center point P2 of the opening 12A4. However, the number of fluid circulation ports 46 and the position thereof are not limited to this and may be any number and position.

(First Region and Second Region on Surface of Cylinder Block)

In the present embodiment, the surface 14 of the cylinder block 10 is also formed with a first region AB1 and a second region AB2 having a hardness higher than that of the first region AB1. In other words, in the entire region of the surface 14, a region other than the second region AB2 is the first region AB1. The second region AB2 preferably has the HV0.2 hardness of 2.5 times or more and 4.5 times or less at the depth of 0.3 mm to 0.5 mm with respect to the first region AB1. Further, the second region AB2 preferably has the HV0.2 hardness of 200 or more and 400 or less at the depth of 0.1 mm. By setting the hardness of the second region AB2 in the above range, wear can be appropriately suppressed.

The second region AB2 is formed by performing a curing treatment on the surface 14 for improving the hardness. That is, on the surface 14, the region where the curing treatment is not performed is the first region AB1, and the region where the curing treatment is performed is the second region AB2. The curing treatment here is the same as the curing treatment of the cylinder head 20 described above.

The second region AB2 is formed at a position overlapping the second region AH2 of the cylinder head 20 when viewed from the direction Z. Specifically, the second region AB2 is formed on the surface 14 around the opening 12. The second region AB2 is formed in at least a part of a section in the entire circumference surrounding the opening 12. That is, the second region AB2 may be formed over the entire circumference surrounding the opening 12 or may be formed in a part of section in the entire circumference surrounding the opening 12. When the second region AB2 is formed in a part of section in the entire circumference surrounding the opening 12, the other section in the entire circumference becomes the first region AB1. Furthermore, the second region AB2 is formed between the opening 12 and the fluid circulation port 42 around the opening 12 and in the radial direction around the center point P2 of the opening 12. In other words, the second region AB2 is formed on the outer side of the opening 12 and inside the fluid circulation port or the fastening hole 40 in the radial direction around the center point P2 of the opening 12. It can be said that the first region AB1 is formed on the outer side of the fluid circulation port or the fastening hole 40, but the second region AB2 is not formed thereon.

In the example of FIG. 3, a plurality of second regions AB2 are formed around the opening 12A1 on the opposite side of the direction Y at predetermined intervals in the circumferential direction. The length of the interval between the second regions AB2 arranged in the circumferential direction of the opening 12A1 may be set to any length. Further, in the example of FIG. 3, the second region AB2 is formed around the opening 12A2 at a location, which is on the direction Y side of the opening 12A2 and opposite to the direction X. Specifically, when a virtual straight line L2 from the center point P2 of the opening 12A2 toward the direction Y is defined as 0 degrees, the direction X side is defined as positive, and the side opposite to the direction X is defined as negative, the second region AH2 is formed from a position of −50 degrees to a position of −20 degrees. Further, in the example of FIG. 3, the second region AB2 is formed around the opening 12A3 on the entire circumference surrounding the opening 12A3. Further, in the example of FIG. 3, the second region AB2 is formed from the position of −135 degrees to the position of −45 degrees around the opening 12A4. However, the position of the second region AB2 formed around each of the openings 12A1, 12A2, 12A3, and 12A4 is not limited to the above. For example, the position of the second region AB2 formed around any of the openings 12A1, 12A2, 12A3, and 12A4 in FIG. 3 may be applied to the periphery of all the openings 12.

As described above, since the second region AB2 having high hardness is formed on the surface 14 of the cylinder block 10, the wear of the surface 14 is suppressed and the leakage of the combustion gas is suppressed. Further, by not making the entire region of the surface 14 of the cylinder block 10 the second region AB2 and leaving the region for the first region AB1, it is not necessary to perform the curing treatment on unnecessary locations, and the load of the curing treatment can be reduced. Further, by providing the second region AB2 around the opening 12, it is possible to appropriately suppress the leakage of the combustion gas from the opening 12. In the present embodiment, both the cylinder block 10 and the cylinder head 20 include a second region having high hardness. However, the second region may be included one of the cylinder block 10 and the cylinder head 20, and may not be included the other. That is, the laser quenching may be performed only on one of the cylinder block 10 and the cylinder head 20.

(Gasket)

Figure 4:
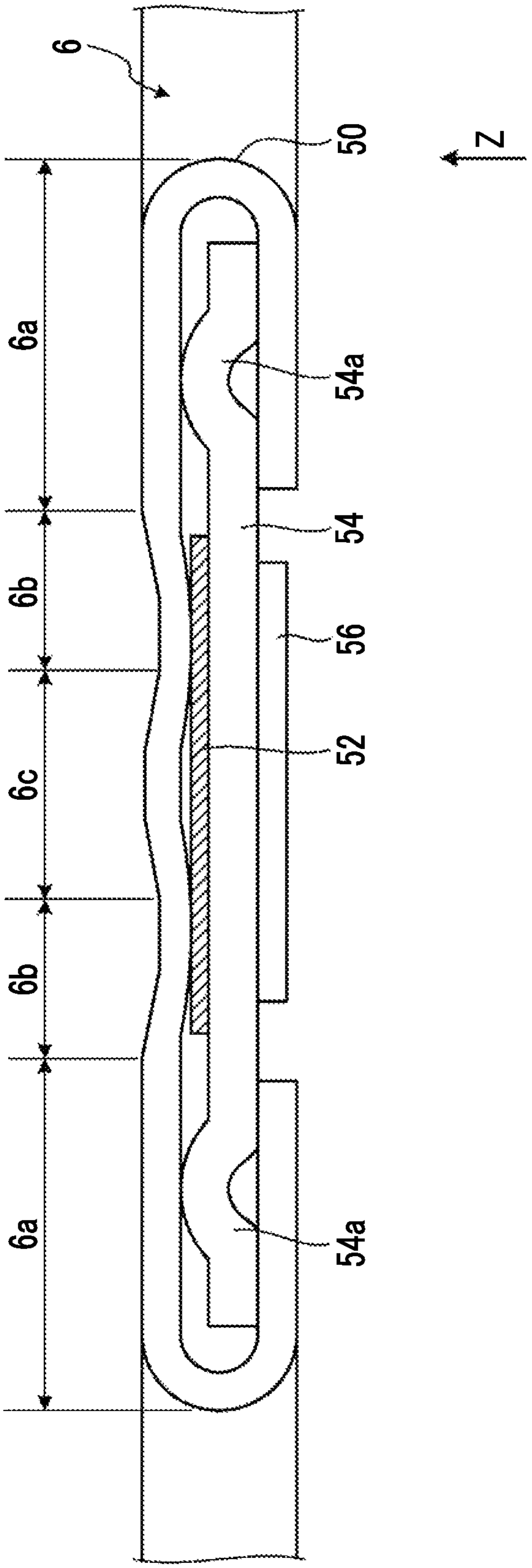
FIG. 4 is an example of a schematic cross-sectional view of a gasket.

FIG. 4 is an example of a schematic cross-sectional view of a gasket. As shown in FIG. 4, the gasket 6 has a plurality of gasket layers 50, 52, 54, and 56. In the example of FIG. 4, the gasket layer 50 is disposed on the uppermost side (the cylinder head 20 side), the gasket layer 56 is disposed on the lowermost side (the cylinder block 10 side), and the gasket layers 52 and 54 are provided between the gasket layer 50 and the gasket layer 56. The gasket 6 is formed with a plurality of portions having different thicknesses or rigidity in the cross-sectional direction, such as a bead portion **6*a*, a recessed portion 6*b*, and a projecting portion 6*c*. The bead portions 6*a* are formed at both end portions of the gasket 6. In the bead portion 6*a*, the gasket layer 50 is bent downward (the cylinder block 10 side) and interposes the gasket layers 52 and 54. In the bead portion 6*a*, a protruding portion 54*a* is formed on the gasket layer 54. The gasket layer 50 interposes the protruding portion 54*a*. Since the bead portion 6*a* has the protruding portion 54*a*, a surface pressure is generated when the bead portion 6*a* is interposed between the cylinder block 10 and the cylinder head 20. The recessed portion 6*b* is formed at a position adjacent to the bead portion 6*a*. An upper surface of the recessed portion 6*b* is more recessed than the bead portion 6*a* and the projecting portion 6*c*. The projecting portion 6*c* is formed between the two recessed portions 6*b*. The gasket layer 52 is formed to be narrower as compared with the gasket layer 54, and end portions of the gasket layer 52 are positioned more on the center side than end portions of the gasket layer 54. The gasket layer 52 is laminated over the recessed portion 6*b* and the projecting portion 6*c* and is not laminated at the bead portion 6*a*. When such a gasket 6 is used, the second region AB2 of the cylinder block 10 and the second region AH2 of the cylinder head 20, that is, the cured regions are preferably formed at a position overlapping the bead portion 6*a* of the gasket 6 when viewed from the direction Z. By setting the positions overlapping the bead portion 6***a* where the surface pressure is generated as the second regions AB2 and AH2, wear can be appropriately suppressed. However, the formation position of the cured region is not limited to the above and may be formed, for example, at a position overlapping the projecting portion 6*c*. Since the surface pressure may also be generated in the projecting portion 6*c*, it is also effective to form a cured region at a position overlapping the projecting portion 6*c*. The configuration of the gasket 6 shown in FIG. 4 is an example, and the gasket 6 may have any shape. However, it is preferable that the gasket 6 is formed with the bead portion for generating the surface pressure, and it is preferable that the second region AB2 of the cylinder block 10 and the second region AH2 of the cylinder head 20 are formed at positions overlapping the bead portion of the gasket 6 when viewed from the direction Z.

(Other Examples of Position of Second Region)

Figure 5:
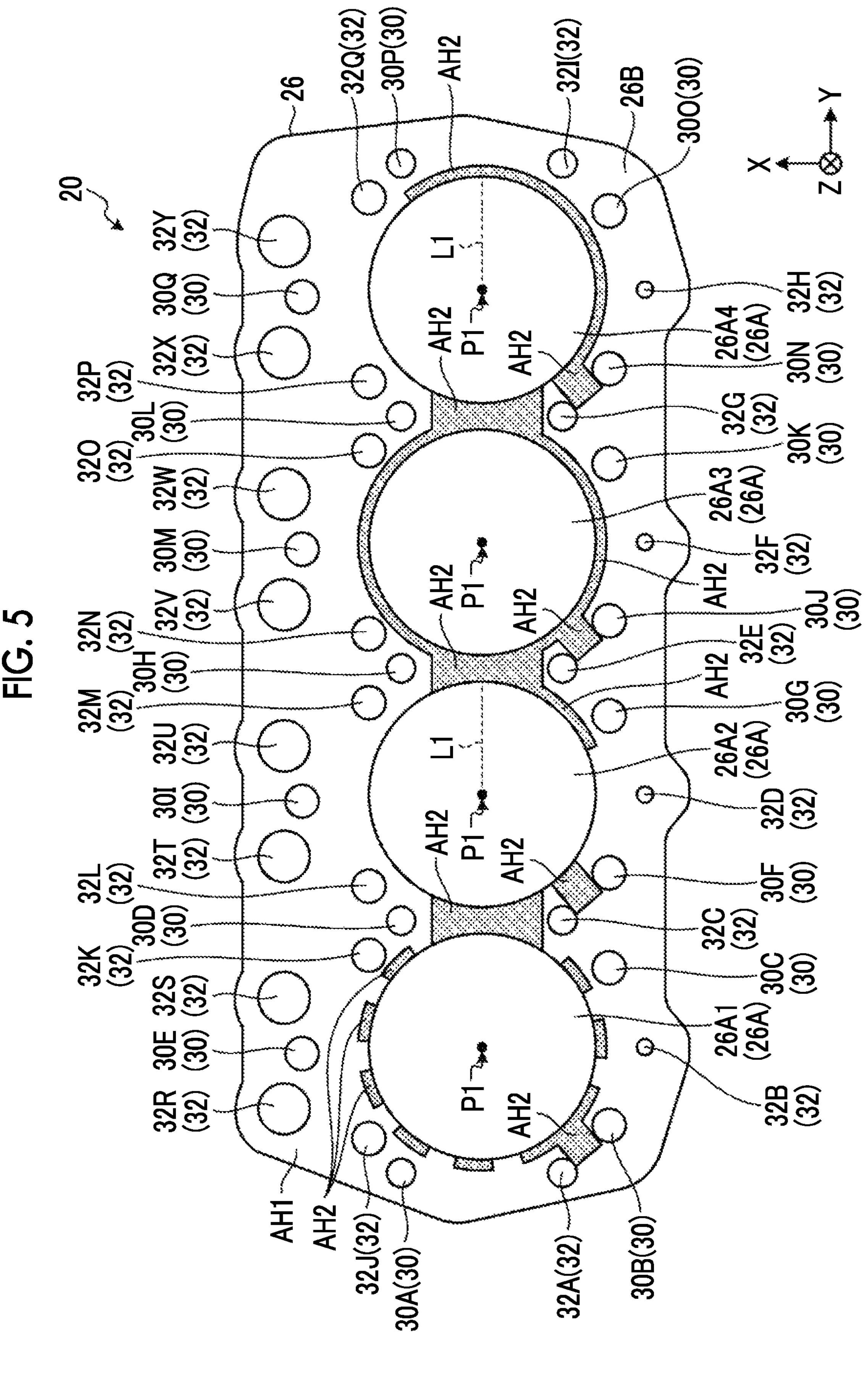
FIG. 5 is a view illustrating another example of a position of a second region.

Further, the positions of the second regions AH2 and AB2 are not limited to the above description. FIG. 5 is a view illustrating another example of the position of the second region. As shown in FIG. 5, the second region AH2 of the cylinder head 20 may be formed between the first portions 26A adjacent to each other. Further, the second region AH2 of the cylinder head 20 may be formed between a pair of fastening holes 30 (a first fastening hole and a second fastening hole) where a distance therebetween is the longest distance among the distances between the fastening holes 30 adjacent to each other in the circumferential direction of the first portion 26A. In the example of FIG. 5, distances between the fastening holes 30 adjacent to each other in the circumferential direction among the fastening holes 30A to 30E around the first portion 26A1, a distance between the fastening hole 30A and the fastening hole 30B is the longest. Therefore, the second region AH2 is formed between the fastening hole 30A and the fastening hole 30B in the circumferential direction of the first portion 26A1. Similarly, around the first portion 26A2, 26A3, and 26A4, the second regions AH2 are formed between the fastening hole 30D and the fastening hole 30F, between the fastening hole 30H and the fastening hole 30J, and between the fastening hole 30G and the fastening hole 30N, which have the longest distances between the fastening holes. In the description of FIG. 5, although it is described such that the second region AH2, which is formed between the first portions 26A adjacent to each other or formed between the pair of fastening holes 30 having the longest distance, has a constant region, it is not limited to occupying the entire region described in FIG. 5 and may occupy only a part of the region described in FIG. 5.

Although FIG. 5 describes an example of the second region AH2 of the cylinder head 20, the second region AB2 of the cylinder block 10 may also be provided at the same position as in FIG. 5. That is, the second region AB2 of the cylinder block 10 may be formed between the openings 12 adjacent to each other. Further, the second region AB2 of the cylinder block 10 may be formed between a pair of fastening holes 40 (a first fastening hole and a second fastening hole) where a distance therebetween is the longest distance among the distances between the fastening holes 40 adjacent to each other in the circumferential direction of the opening 12.

(Method for Manufacturing)

Figure 6:
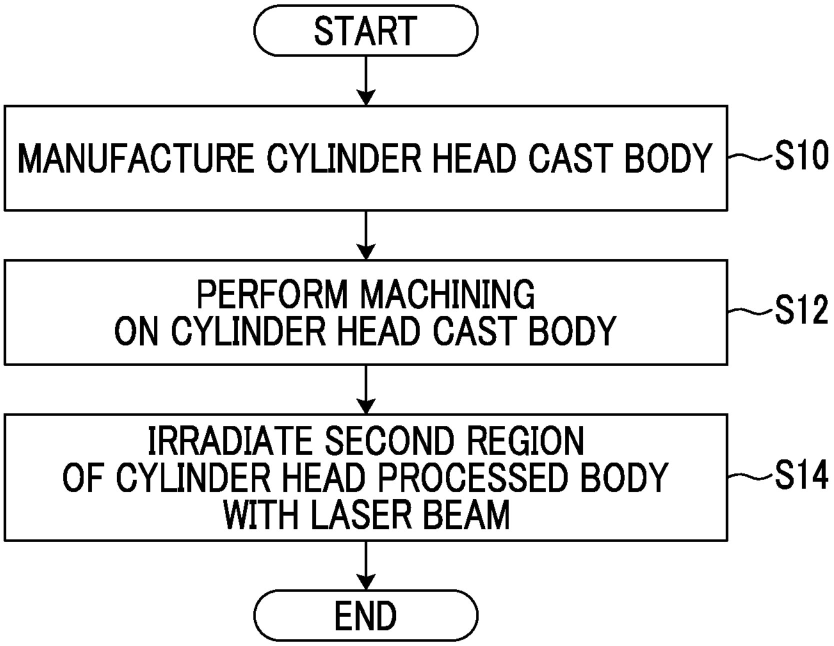
FIG. 6 is a flowchart illustrating a method for manufacturing the cylinder head according to the present embodiment.

FIG. 6 is a flowchart illustrating a method for manufacturing the cylinder head according to the present embodiment. When manufacturing the cylinder head 20, first, a cylinder head cast body is manufactured by casting (step S10). Thereafter, machining is performed on the cylinder head cast body (step S12) to form the surface 26 or the like. Thereafter, the laser quenching is performed by irradiating the cylinder head processed body, which is the machined cylinder head cast body, with the laser beam at a location to be the second region of the surface 26 (step S14). That is, in step S14, the entire surface 26 of the cylinder head processed body becomes the first region AH1, and by applying the curing treatment (here, laser beam irradiation) to a part of the surface 26, the second region AH2 is formed where the curing treatment is performed (the laser beam irradiation is performed) on the surface 26. The portion on the surface 26 where the curing treatment is not performed (the laser beam irradiation is not performed) remains as the first region AH1. As a result, the first region AH1 and the second region AH2 are formed on the surface 26, and the manufacturing of the cylinder head 20 is ended. The method for manufacturing the cylinder block 10 is the same. That is, a cylinder block cast body is manufactured by casting, and the machining is performed on the cylinder block cast body to form the surface 14 or the like. Thereafter, the laser quenching is performed by irradiating the machined cylinder block cast body with the laser beam at a location to be the second region of the surface 14. That is, by applying the curing treatment (here, the laser beam irradiation) to a part of the surface 14, the second region AB2 is formed where the curing treatment is performed (the laser beam irradiation is performed) on the surface 14. The portion on the surface 14 where the curing treatment is not performed (the laser beam irradiation is not performed) remains as the first region AB1. As a result, the first region AB1 and the second region AB2 are formed on the surface 14, and the manufacturing of the cylinder block 10 is ended. By performing the laser quenching, the location irradiated with the laser beam swells slightly so that the sealing surface pressure can be further increased. As described above, the method for the curing treatment is not limited to the laser quenching, and examples thereof include the high frequency quenching, the shot peening, and the like. When the laser beam is not used, such as the high frequency quenching or the shot peening, the machining is usually performed after the curing treatment.

(Effects of Present Embodiment)

As described above, the cylinder head 20 according to the present embodiment is attached to the cylinder block 10. The surface 26 of the cylinder head 20 on a side to be attached to the cylinder block 10 includes the first region AH1 and the second region AH2 that has the hardness higher than that of the first region AH1. By forming the second region AH2 on the surface 26 of the cylinder head 20, the wear that is caused by the relative slippage with the surface 14 of the cylinder block 10 can be suppressed, and the leakage of combustion gas from the surface 26 can be suppressed. Further, by not making the entire region of the surface 26 of the cylinder head 20 the second region AH2 and leaving the region for the first region AH1, it is not necessary to perform the curing treatment on unnecessary locations, and the load of the curing treatment can be reduced.

Further, the second region AH2 is formed on the surface 26 around the portion (the first portion 26A) of the cylinder head 20, which is exposed to the combustion gas. In the cylinder head 20 according to the present embodiment, by forming the second region AH2 around the first portion 26A, the wear in the region around the first portion 26A that is exposed to combustion gas is suppressed, and the leakage of the combustion gas from the first portion 26A can be appropriately suppressed.

Further, the second region AH2 is formed on a part of the entire circumference surrounding the portion exposed to the combustion gas (the first portion 26A), and the first region AH1 is formed in a portion other than the second region AH2 in the entire circumference surrounding the portion (the first portion 26A) that is exposed to the combustion gas in the entire circumference surrounding the portion (the first portion 26A) that is exposed to the combustion gas.

Further, the fluid circulation port (in the example of the present embodiment, the fluid circulation ports 32 and 34, and the fluid circulation port 36), through which fluid other than the combustion gas circulates, is formed on the surface 26, and the second region AH2 is formed between the portion (the first portion 26A) that is exposed to the combustion gas and the fluid circulation port. By forming the second region AH2 between the first portion 26A and the fluid circulation port, the cylinder head 20 can appropriately suppress the leakage of the combustion gas from the first portion 26A to the fluid circulation port.

Further, the plurality of fastening holes 30 into which the fastening members are inserted are formed around the portion on the surface 26 exposed to the combustion gas (the first portion 26A) along the circumferential direction. In the circumferential direction, the second region AH2 is formed between the first fastening hole and the second fastening hole where the distance therebetween is the longest distance among the distances between the fastening holes 30 adjacent to each other in the circumferential direction. By forming the second region AH2 between the first fastening hole and the second fastening hole, the cylinder head 20 can appropriately suppress the wear in the region where the axial force (the surface pressure) is lower than the others.

Further, the cylinder block 10 according to the present embodiment is attached to the cylinder head 20. The surface 14 of the cylinder block 10 on a side to be attached to the cylinder head 20 includes the first region AB1 and the second region AB2 that has the hardness higher than that of the first region AB1. By forming the second region AB2 on the surface 14, the cylinder block 10 can suppress the wear caused by the relative slippage with the cylinder head 20 and suppress the leakage of the combustion gas from the surface 14. Further, by not making the entire region of the surface 14 the second region AB2 and leaving the region for the first region AB1, it is not necessary to perform the curing treatment on unnecessary locations, and the load of the curing treatment can be reduced.

Further, the internal combustion engine 1 according to the present embodiment includes at least one of the cylinder head 20 and the cylinder block 10. Since the internal combustion engine 1 includes at least one of the cylinder head 20 and the cylinder block 10, the leakage of the combustion gas can be suppressed.

Further, the method for manufacturing the cylinder head 20 to be attached to the cylinder block 10 according to the present embodiment includes a step of forming the first region AH1 where the curing treatment is not performed and the second region AH2, where the curing treatment is performed and the hardness is higher than that of the first region AH1, by performing the curing treatment on a part of the surface 26 on the side to be attached to the cylinder block 10. According to the manufacturing method, by forming the second region AH2 on the surface 26, the wear can be suppressed and the leakage of the combustion gas from the surface 26 can be suppressed.

Further, the manufacturing method according to the present embodiment includes forming the first region AH1 not irradiated with the laser beam and the second region AH2 irradiated with the laser beam by irradiating the part on the surface 26 with the laser beam. According to this manufacturing method, by performing the laser quenching, the second region AH2 can be selectively and appropriately cured, and thermal deformation of the cylinder head 20 can be suppressed.

Although the embodiment of the present invention has been described above, the embodiment is not limited by the contents of the embodiment. Further, the above-mentioned components include those that can be easily assumed by those skilled in the art, those that are substantially the same, that is, those in a so-called equal range. Furthermore, the components described above can be combined as appropriate. Further, various omissions, replacements, or changes of the components can be made without departing from the gist of the above-described embodiment.

REFERENCE SIGNS LIST

1 Internal combustion engine
2 Cylinder head assembly
4 Cylinder block assembly
6 Gasket
10 Cylinder block
12 Opening
14, 26 Surface
20 Cylinder head
26A First portion
26B Second portion
30, 40 Fastening hole
32 Fluid circulation port
AB1, AH1 First region
AB2, AH2 Second region

The invention claimed is:

1. A cylinder assembly comprising:
a cylinder block;
a cylinder head in contact with a surface of the cylinder block; and
a gasket installed between the surface of the cylinder block and a surface of the cylinder head,
wherein both ends of the gasket include:
a bead portion wherein a protruding portion is formed, and
wherein the surface of the cylinder block includes:
a first region and a second region having a hardness higher than that of the first region, and
wherein the second region is formed into the surface of the cylinder block around a portion exposed to combustion gas and wherein the second region is overlapped by the bead portion.

2. An internal combustion engine comprising:
the cylinder assembly according to claim 1.

* * * * *